(12) United States Patent
Westersten

(10) Patent No.: US 7,701,337 B2
(45) Date of Patent: Apr. 20, 2010

(54) HYBRID-TECHNOLOGY METAL DETECTOR

(76) Inventor: Allan Westersten, P.O. Box 50, Georgetown, CA (US) 95634-0050

( * ) Notice: Subject to any disclaimer, the term of this patent is extended or adjusted under 35 U.S.C. 154(b) by 657 days.

(21) Appl. No.: 11/514,488

(22) Filed: Aug. 31, 2006

(65) Prior Publication Data

US 2007/0046288 A1   Mar. 1, 2007

Related U.S. Application Data

(60) Provisional application No. 60/713,420, filed on Aug. 31, 2005.

(51) Int. Cl.
*G08B 13/18* (2006.01)
(52) U.S. Cl. .................. 340/552; 340/551; 340/553; 324/326; 324/327; 324/331; 324/332
(58) Field of Classification Search .............. 340/552, 340/551, 553; 324/325, 326, 327, 328, 329, 324/330, 331, 332
See application file for complete search history.

(56) References Cited

U.S. PATENT DOCUMENTS 4,110,679 A * 8/1978 Payne .................... 324/329

* cited by examiner

*Primary Examiner*—George A Bugg
*Assistant Examiner*—Sisay Yacob

(57) ABSTRACT

A hybrid-technology metal detector, using pulse-induction and sine-wave excitation of the transmitter coil alternately, in rapid succession.

The energy stored in the transmitter coil, in the pulsed mode, is used to shock-excite a high-Q circuit formed by the coil and a parallel capacitor into oscillations in the sine-wave mode.

The multiplicative action of the circuit Q causes high currents to flow in the transmitter coil, causing high fluxes to be impressed on the searched area, with increased sensitivity as a result.

Using a linear coil-current ramp to assess and minimize the coupling between the transmitter and receiver coils permits effective separation of the reactive and resistive components of the target signals, making accurate identification of targets possible.

5 Claims, 5 Drawing Sheets

HYBRID-TECHNOLOGY METAL DETECTOR

This application claims priority from provisional patent application 60/713,420 filed Aug. 31, 2005, which is incorporated herein by reference.

BACKGROUND AND THEORY OF THE INVENTION

This invention is related to metal detectors and especially to metal detectors that combine pulse-induction and sine-wave technologies in one instrument.

Metal detectors based on the pulse-induction principle are less affected by ground mineralization than sine-wave detectors. This advantage is counter-balanced by their lower sensitivity to small targets and a lower power-efficiency. The latter necessitates the use of heavy battery packs for portable detectors.

Sine-wave detectors, while capable of high sensitivity, require frequent "re-balancing", when the soil's or ore's content of magnetic minerals varies. This procedure is unacceptable in stationary industrial metal detectors and it constitutes a major inconvenience for users of portable detectors.

A detector that combined the advantages of both technologies would represent a definite advance in the metal detector art. The realization of this fact has led to attempts to develop detectors that combine the pulse-induction and sine-wave technologies. US Patent Application No. 2005/0062477 by Nelson is an example of this.

While Nelson's patent addresses some of the problems inherent in a dual-technology detector, it does not take full advantage of the opportunities such an approach presents.

In Nelson's patent, the sine-wave and pulse components of the current wave-form are impressed on the coil at the same time. A much more effective result is achieved by separating these components in time.

A practical detector must include means to counteract the influence of the magnetic minerals in the ground. No such technology is described in the Nelson patent. Another method for distinguishing between ferrous and non-ferrous metals is described in U.S. Pat. No. 4,110,679 by Payne. The method relies on the presumption that ferrous metals exhibit hysteresis in their magnetization curves.

The sensitivity of Payne's method is directly proportional to the width of the hysteresis loop. It is known to metallurgists that the process of annealing will dramatically reduce the width of the hysteresis loop. As a result, ferrous targets at the site of a fire, such as nails that were in the walls of a building, may all be erroneously identified as non-ferrous targets. In contrast, annealing will increase the permeability of ferrous materials, which will make them more easily identified by the present invention.

In sine-wave detectors, "ground balancing" is accomplished by placing the demodulating gate so that the portions of the signal above and below the base line cancel, as shown in FIG. 1.

In pulse-induction type metal detectors, the bulk of the ground signal is eliminated by delaying the signal sampling pulse until ground signals have decayed to essentially zero. Unfortunately, this simple expedient allows signals from some desirable targets with short time constants, such as gold nuggets, to also decay to zero before the signal is sampled.

In addition to generating a signal that emanates from the soil and is picked up by the receiver coil, a soil with high magnetic permeability engenders another signal by affecting the mutual inductance between the transmitter and receiver coils.

Unless special measures are taken, this mutual-inductance signal contaminates the signal generated by a target, and its magnitude can be such that the input amplifier of a detector is driven into saturation.

Balanced coil configurations such as the one shown in FIG. 2, mitigate this problem, but owing to the fact the magnitude of the reactive ground signal can be two orders of magnitude larger than the target signal, very precise positioning of the demodulating pulse is required. Often, tiered multi-turn potentiometers are used in the state-of-the-art detectors, to adjust the position of the gate. While touted as means to effect precise adjustment, it is obvious to one skilled in the art that such arrangements are required because the adjustment is very critical.

In a detector using hybrid technology, a better option is available. When the transmitter coil is energized with a linear current ramp, as shown by trace 76 in FIG. 4, the signal sampled at the end of the ramp is only affected by the reactive component of the ground signal. When the duration of the ramp is long enough, all resistive signals have decayed to essentially zero, and thus, reactive and resistive signals have been effectively separated. This is very difficult, if not impossible to accomplish in a sine-wave system.

The linear current ramp 76 generates a DC pulse 78 in the receiver coil. This signal can be cancelled by a compensating pulse of the appropriate amplitude and polarity from a compensating coil, designated 26 in FIG. 3. A negative feedback loop is used to set the digital potentiometer 28 in FIG. 3, so that the signal sampled at the end of the current ramp is driven to zero. When the coil system has been balanced in this fashion, it remains balanced for reactive signals generated after the coil pulse.

In a conventional pulse-induction detector, the target signal is sampled after the transmitter coil current has returned to zero. The eddy currents in the target are induced by the abrupt transition of the coil current. In such a system, the energy contained in the transmitter coil is largely wasted, since a very small fraction is absorbed by the target.

There are systems that attempt to retrieve some of that energy, but methods such as the one described by Candy in U.S. Pat. No. 6,686,742, prolong the transition of the coil current to zero, thus decreasing the voltage induced in the target and reducing the detector's sensitivity to small targets.

In the present invention, the transmitter coil is paralleled with a high-Q capacitor. The energy contained in the transmitter coil is allowed to oscillate until the energy is dissipated in the series resistance of the coil. If care is taken to make the transmitter coil with low-resistance wire and to use a high-Q capacitor, the circuit will "ring" for many cycles.

Thus, additional target signal can be retrieved from each cycle, maximizing the return signal for a given energy expenditure in the transmitter coil.

OBJECTS AND ADVANTAGES

It is an object of the present invention to provide a metal detector that includes both pulse-induction and sine-wave technologies in one instrument. It is a further object of the invention to incorporate the best attributes of both systems, without any of their disadvantages.

A prominent advantage of the combined system is that the reactive and resistive signals captured by the receiver coil are effectively separated, whereby a dynamic ground-balancing system can be implemented, without loss of sensitivity or the accidental "balancing out" of desirable targets, as can occur in conventional sine-wave detectors.

It is another advantage of the hybrid system that its sensitivity to targets is increased beyond what is possible with either component system by itself. While target signal increases by two orders of magnitude have been observed, the ultimate limit of improvement has not yet been determined.

DESCRIPTION OF THE PREFERRED EMBODIMENT

Figure 3:
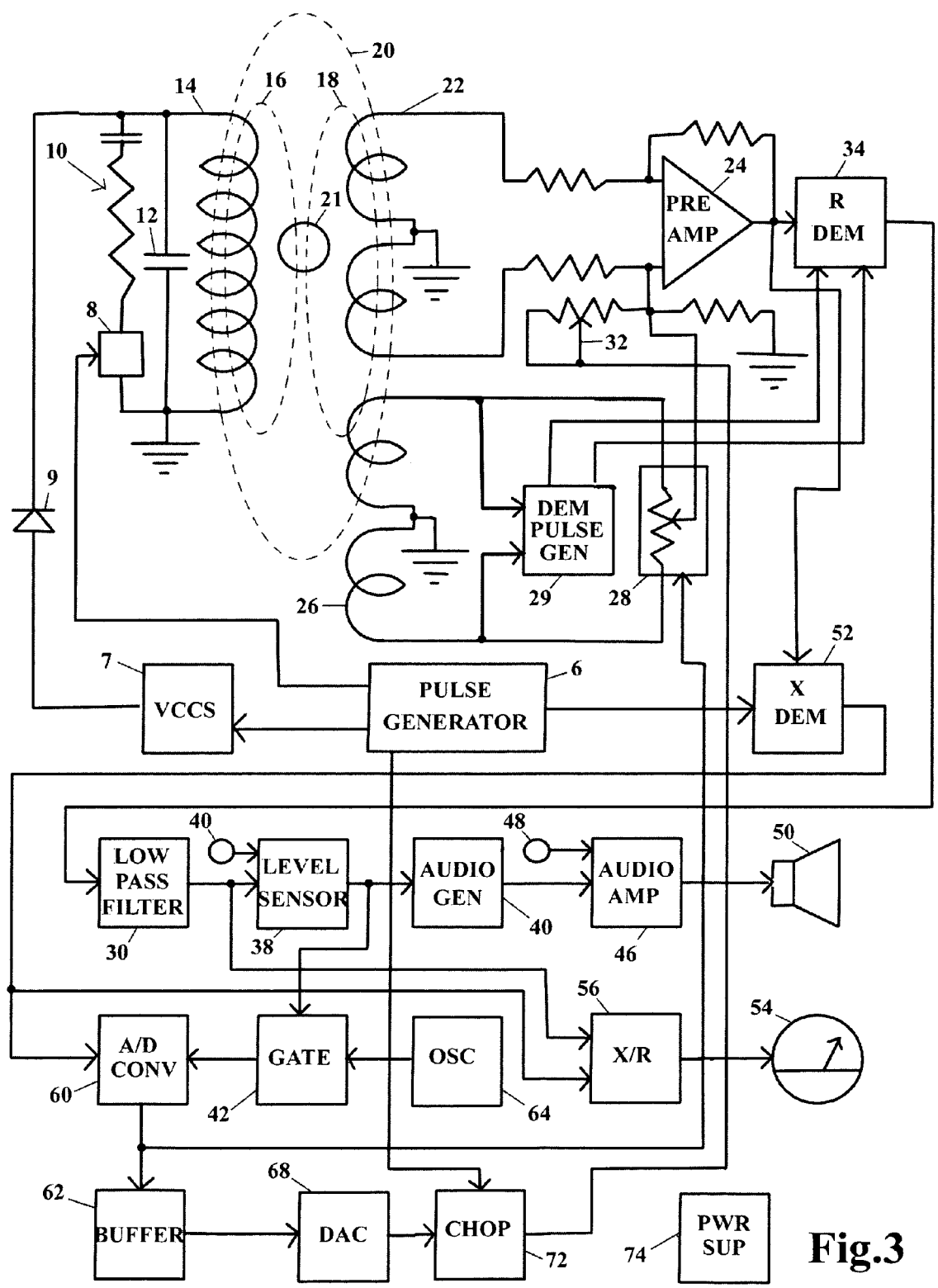
FIG. 3 shows a block diagram of the present invention.

In FIG. 3, pulse generator 6 sends a linear voltage ramp to voltage-controlled current source 7, which drives transmitter coil 14. The coil is isolated from the current source by "free-wheeling diode" 9, which guarantees that the output impedance of the current source is disconnected from the coil, when no current is flowing.

Capacitor 12 connected across the coil is of a low-loss type that has a low equivalent series resistance, which ensures that the circuit formed with the transmitter coil has a high Q.

Damping circuit 10 is connected across the transmitter coil at predetermined intervals, by means of switch 8, under the control of pulse generator 6.

Figure 1:
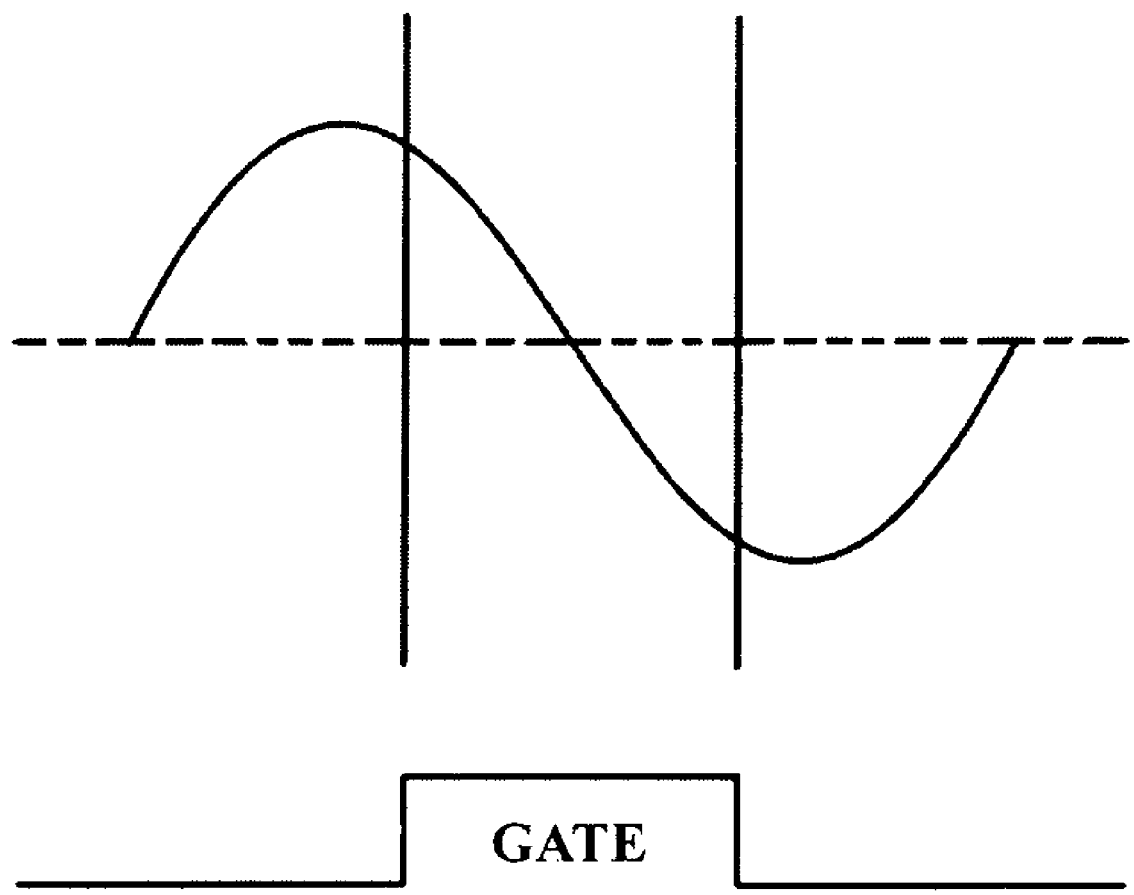
FIG. 1 shows the demodulation technique of prior-art sine-wave detectors.
Figure 2:
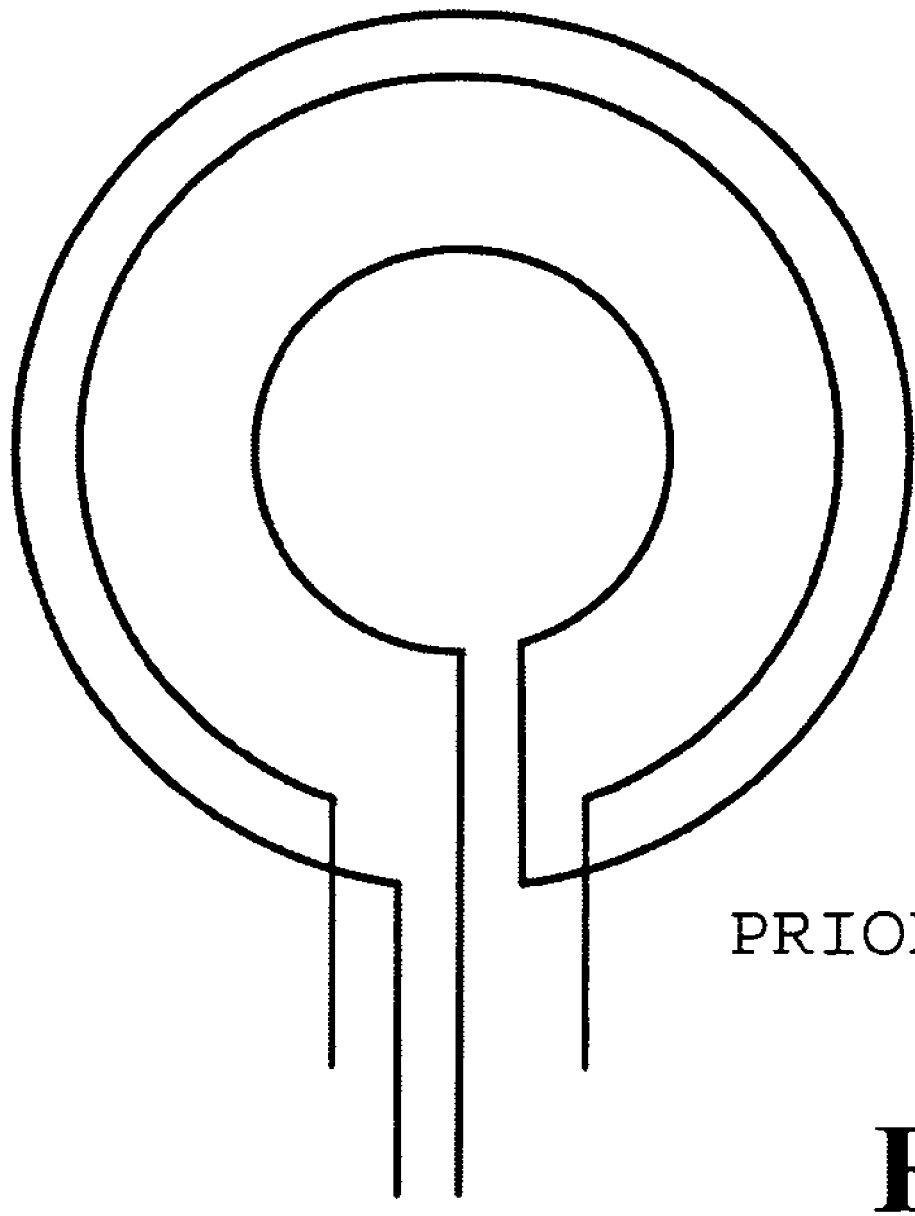
FIG. 2 shows a balanced coil configuration of prior art.

Receiver coil 22 is of the balanced-induction variety, as shown in FIG. 2, to minimize the magnitude of the voltage generated by direct coupling between the transmitter and receiver coils, as show by magnetic induction lines 20 in FIG. 3.

Preamplifier 24 amplifies the received signal to a level at which the signal-to-noise ratio is such that the influence of internal and external noise sources is insignificant.

Resistive-signal component demodulator 34 receives its demodulating pulses from inductive pickup coil 26. The signal from the coil is amplified and converted to square pulses by demodulating pulse generator 29. The signal from the coil is also imposed on digitally controlled potentiometer 28, which is adjusted by a negative feedback loop, so that the reactive signal picked up by receiver coil 22 remains cancelled, even when the mutual inductance between the transmitter and receiver coils varies, owing to the presence of magnetic minerals in the soil.

The demodulated resistive-signal component is passed through low-pass filter 30, to remove noise components of the signal, and imposed on level sensor 38, which has a user-adjustable threshold 40. When level sensor 38 is triggered, audio generator 40 is activated and a signal is passed to audio amplifier 46. User-adjustable volume control 48 sets the level of the sound produced by speaker 50.

Reactive-signal component demodulator 52 yields a negative signal when the target is ferrous and a positive signal when the target is non-ferrous. While level sensor 38 is in a non-triggered state, the reactive-signal output is maintained at zero by the feedback loop. When the level sensor is triggered, the feedback loop is opened, and the reactive signal is allowed to assume a non-zero value, whose sign indicates the nature of the target.

Divider 56 determines the ratio between the reactive and resistive signal components. The number derived is characteristic of the target being sensed. The method has been used in prior art, but the accuracy obtained in the present invention is considerably higher, owing to the elimination of the influence of the reactive ground signal.

The signal derived by divider 56 is displayed on meter 54. Thus, when the presence of a target is indicated by a tone from speaker 50, the nature of the target is displayed on meter 54.

Power supply 74 delivers appropriate voltages to the various components of the system.

OPERATION OF THE PREFERRED EMBODIMENT

Figure 4:
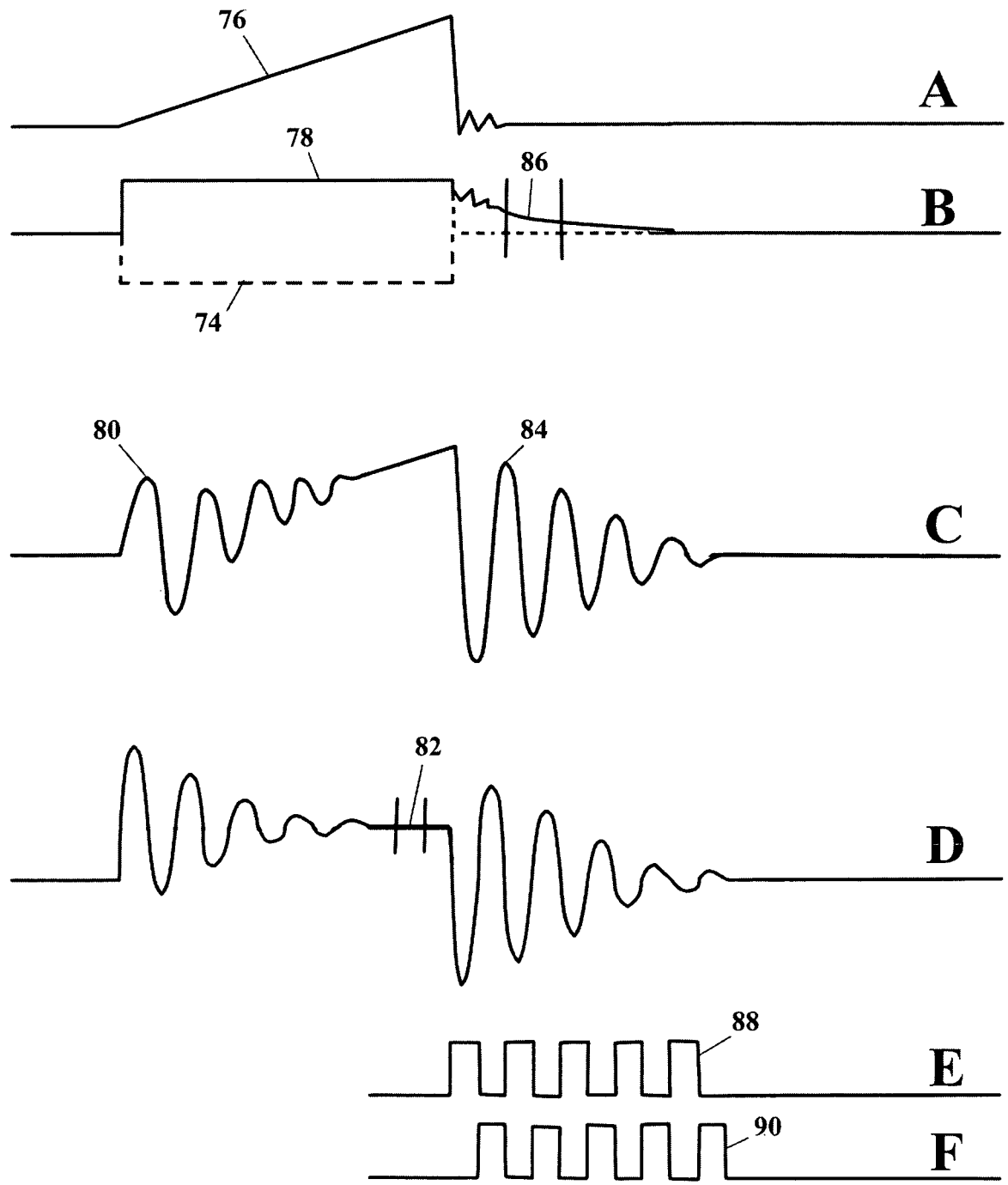
FIG. 4 shows the voltage and current waveforms of the present invention.

Pulse generator 6, in FIG. 3 generates a linear voltage ramp, as shown by trace 76 in FIG. 4. This signal is converted into a current waveform by voltage-controlled current source 7, and imposed on transmitter coil 14.

The voltage induced in the receiver coil owing to inductive coupling between the coils is show by trace 78 in FIG. 4. This signal represents the inductive imbalance of the coil system and it is modified by the presence of magnetic minerals in the ground. The amplitude of DC level 78 is proportional to the derivative of current ramp 76. The oscillation shown by trace 80 arises as a result of shock excitation of the coil system.

FIG. 4-D shows the voltage intercepted by the receiver coil where the signal caused by the linear coil-current ramp is added to the oscillatory signal. Thus, interval 82 in FIG. 4-D reflects the amplitude of trace 78 of FIG. 4-B. When interval 82 is driven to essentially zero by negative feedback action, the oscillatory signal is likewise driven to near-zero levels. This stems from the fact when the coil system is inductively balanced, signals caused by mutual inductance are reduced in equal measure, be they caused by a linear current-ramp or by an oscillatory current. To prevent the oscillation from encroaching on time interval 82, where the imbalance signal is sampled, damping circuit 10 is connected across the coil by switch 8, in response to a pulse from generator 6.

To prevent the oscillation from encroaching on time interval 82, where the imbalance signal is sampled, damping circuit 10 is connected across the coil by switch 8, in response to a pulse from generator 6.

Receiver coil 22 is of the balanced variety. An initial mechanical alignment of the coils leaves a small residual imbalance signal, which appears as a DC offset at interval 82. After amplification by preamp 24, this signal is sampled by reactive-signal demodulator 52, in response to a gating pulse issued by pulse generator 6.

The sampled signal is digitized by A/D converter 60 and stored in digital form in buffer 62. Digital storage being static, the signal can be reconverted to analog form by DAC 68 and converted into a pulse by chopper 72. Potentiometer 32 is adjusted to provide the optimal speed of action of the feedback loop, without causing it to break into oscillation.

Trace 84 in FIG. 4 shows the shape of the received signal, immediately after the coil current has abruptly returned to zero. At this time, damping circuit 10 is disconnected from the coil circuit, which is allowed to oscillate freely, since it is disconnected from the current source by free-wheeling diode 9. The energy that was stored in the inductance of the transmitter coil is now converted into voltage and current cycles. The intensity of the current is multiplied by the Q-factor of the coil and it can be many times larger than the current that initiated the process. When care is taken to wind the coil with low-resistance wire and to use a high-quality capacitor, Q-values in excess of 15 can be attained.

The Q of the circuit can be conveniently calculated from an observed waveform by computing the logarithmic decrement, which is equal to the natural logarithm of the ratio between two successive voltage peaks. The Q of the circuit is obtained by dividing PI (3.14 . . . ) by the logarithmic decrement.

It can be shown that the target-signal amplitude in the present detector is increased by a factor in excess of 50, compared to the signal generated in a conventional pulse-induction detector. This observation is made simply by disconnecting capacitor 12 in FIG. 3 and by measuring the target signal amplitude at interval 86 in FIG. 4.

The oscillation of the transmitter coil produces a quadrature voltage in the receiver coil. The magnitude of this voltage is a measure of the imbalance of the coil system, just as the DC level appearing at interval 82 in FIG. 4. This voltage must be canceled by a signal of the same wave shape, with the appropriate polarity and amplitude. The correct voltage is derived from compensating coil 26 and channeled to preamp 24 via digital potentiometer 28. In the absence of a resistive target signal, the magnitude of this quadrature signal is maintained near zero by a negative feedback loop similar to the one used to zero interval 82.

An additional improvement over a conventional pulse-induction detector accrues from the fact that the target signal in the present detector can be sampled repeatedly, instead of just once per cycle. When several successive signal samples are cumulated, the resulting sensitivity increase can amount to a factor of 250, compared to a conventional pulse-induction detector.

The appropriate demodulating pulses are derived from coil 26. Demodulating pulse generator 29 converts the sinusoidal signals to square pulses, as shown by traces 88 and 90 in FIG. 4. By this means, the demodulating pulses always remain in the correct phase relationship to the received signals, even when the oscillating frequency of the coil system changes, owing to the influence of magnetic minerals in the soil.

After demodulation, the resistive target signal is passed through low-pass filter 30, to remove high-frequency interference signals. Level sensor 38 fires when a predetermined signal amplitude has been exceeded. At that time, audio generator 40 is activated. The signal is amplified to a volume preset by user control 48. A tone heard in speaker 50 indicates that a target has been located.

While level sensor 38 remains in a triggered state, gating circuit 42 suspends the action of the negative feedback loop via A/D converter 60. Buffer 62 retains the status of the system that prevailed before the detector was triggered, and the relative change of the reactive signal that occurred after that point in time is characteristic of the nature of the target that caused the triggering to occur.

The signal appearing at the output of reactive-signal demodulator 52 is of one polarity when the target is ferrous and of the opposite polarity, when the target is non-ferrous. Dividing circuit 56 determines the ratio between the reactive and resistive components of the target signal. A target with a short time constant, such as a gum wrapper, generates a ratio that is small. A target with a long time constant, such as a silver dollar, generates an X/R ratio that is large. Accordingly, numerical identification numbers can be assigned to targets. Furthermore, when the derived ratio is negative, the target is identified as ferrous. By observing meter 54 after hearing a tone, the user can thus determine whether or not the detected target falls into a category she is interested in recovering.

Figure 5:
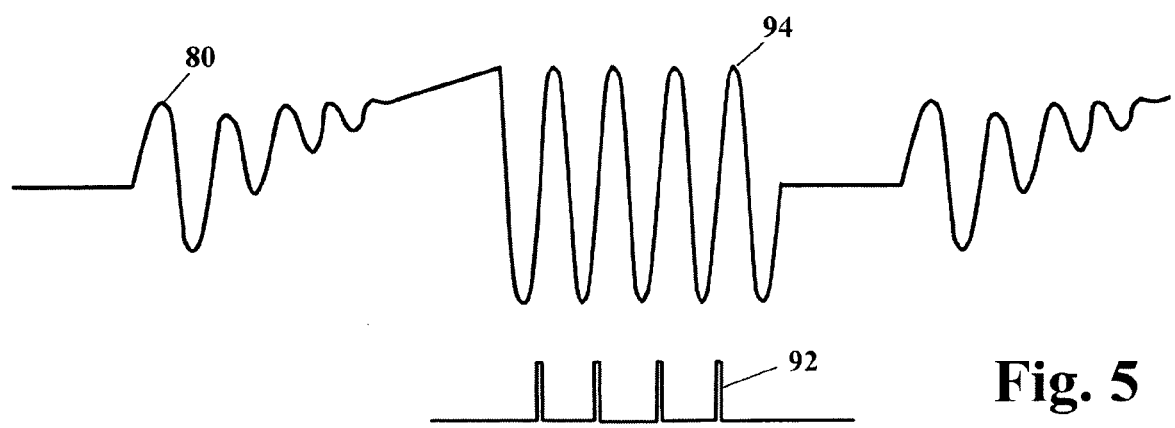
FIG. 5 shows the use of auxiliary coil-current pulses.

Trace 84 in FIG. 4 shows the oscillation of the transmitter coil decreasing gradually in amplitude, as the stored energy of the coil is dissipated in the resistance of the circuit. If the energy lost is supplanted by auxiliary coil pulses, as shown by trace 92 in FIG. 5, the oscillation can be maintained at a constant level for an arbitrary period of time. This makes it possible to increase the number of cycles during which the received signal can be sampled, with a commensurate increase in detector sensitivity.

Power supply 74 in FIG. 3 converts the voltage from a primary source, such as the power line or a battery, to voltages appropriate for the various circuits of the detector.

The functional blocks shown in FIG. 3 are well known to those skilled in the art, and they may be implemented by using integrated circuits or discrete components. The circuitry may also include a microprocessor and appropriate software to carry out some of the functions shown in FIG. 3.

SCOPE AND RAMIFICATIONS

Although the primary use of the present invention is thought to be for locating objects buried in soil, other uses are to be construed as being part of the invention. Possible other applications of the invention could be in the security, mining, food processing and materials testing fields.

I claim:

1. A metal detector operating with pulsed and sine-wave coil excitation in rapid succession, comprising: (a) a transmitter coil connected to a parallel capacitor, forming a resonant circuit, (b) means to excite said transmitter coil alternately with a linear current ramp and sine-wave, by causing said transmitter coil with said parallel capacitor to be shock-excited into oscillations by a pulse and sine-wave excitations, (c) a receiver coil, (d) means to sample and process signals intercepted by said receiver coil further comprising: means to periodically augment the energy oscillating in said transmitter coils with auxiliary coil-current pulses so that the amplitude of said oscillations remains substantially constant and (e) means to alert the operator of the detector, when said signal processing means yields results that meet predetermined criteria.

2. The detector of claim 1, further comprising means to derive demodulating pulses for said processing means so that the signals intercepted by said receiver coil can be separated into reactive and resistive components.

3. The detector of claim 2, further comprising: (a) means to derive a ratio between said reactive and resistive components, and (b) means to display said ratio, as an indication of the nature of the target.

4. The method for operating a metal detector with pulsed and sine-wave coil excitation in rapid succession comprising: said metal detector having a transmitter coil with a parallel capacitor, exciting said transmitter coil alternately with a linear current ramp and a sinusoidal current, shock-exciting said transmitter coil into oscillations with an abrupt change in current intensity at the end of a current pulse, the method further comprising: a receiver coil and signal processing means to sample intercepted by said receiver coil further comprising: means to periodically augment the energy oscillating in said transmitter coils with auxiliary coil-current pulses so that the amplitude of said oscillations remains substantially constant and (e) means to alert the operator of the detector, when said signal processing means yields results that meet predetermined criteria.

5. The method of claim 4, further comprising the step of: periodically augmenting the energy oscillating in said transmitter coil with auxiliary coil-current pulses of such magnitude and phase that the amplitude of said oscillations is held essentially constant for a predetermined time.

* * * * *